United States Patent [19]

Hetherington et al.

[11] 4,357,294

[45] Nov. 2, 1982

[54] MANUFACTURE OF PLASTIC CONTAINERS

[75] Inventors: Brian L. Hetherington, Iverary; Peter Y. Kelly, Kingston, both of Canada

[73] Assignee: Du Pont Canada Inc., Mississauga, Canada

[21] Appl. No.: 229,874

[22] Filed: Jan. 30, 1981

[30] Foreign Application Priority Data

May 24, 1978 [CA] Canada .................................. 304002

[51] Int. Cl.³ ............................................. B29C 17/04
[52] U.S. Cl. ..................................... 264/294; 264/537; 264/544; 264/550; 264/553; 264/328.7
[58] Field of Search ............... 264/537, 538, 544, 550, 264/553, 328.7, 294, 296

[56] References Cited

U.S. PATENT DOCUMENTS

| | | | |
|---|---|---|---|
| 3,602,946 | 9/1971 | Curetti et al. | 18/20 B |
| 3,906,066 | 9/1975 | Barrie | 264/328.7 X |
| 4,005,164 | 1/1977 | Procter | 264/97 |
| 4,187,274 | 2/1980 | Arnason | 264/325 |

Primary Examiner—Jan H. Silbaugh

[57] ABSTRACT

The present invention relates to an improvement in a method for thermoforming of containers from thermoplastic materials in which method the rim of the container is formed as an integral part of the pre-form from which the container is thermoformed. The pre-form is obtained by introducing thermoplastic material into a closed space and then mechanically compressing the material. The improvement of the present invention relates to improved uniformity of flow of the thermoplastic material into the closed space, the use of a closed space defined by surfaces having a surface roughness in the range of 50–125 μm rms and to a modified sequence of steps for forming the pre-form in which the compression of the thermoplastic material is commenced prior to the completion of the introduction of the material into the closed space. The process may be used in the manufacture of containers, e.g., for the packaging of margarine, from polyethylene or polypropylene.

7 Claims, 3 Drawing Figures

4,357,294

MANUFACTURE OF PLASTIC CONTAINERS

BACKGROUND OF THE INVENTION

1. Field of the Invention

The present invention relates to a method for the manufacture of plastic containers, for example, containers for margarine, and especially to an improved method for the thermoforming of such containers from polyethylene or polypropylene.

2. Description of the Prior Art

Methods for the manufacture of plastic containers are known in the art. In particular, in U.S. Pat. No. 3,602,946, issued Sept. 7, 1971, G. E. Curetti, et al. describe a method which involves the formation of a diaphragm of plastic material in a transfer ring with the periphery of the diaphragm being retained in an internal annular groove of the ring. The ring containing the diaphragm is applied to a moulding station where the diaphragm is moulded into a container. The container is then severed from the plastic material retained in the groove, the annulus of plastic material so formed being discharged to waste or re-used.

In U.S. Pat. No. 4,005,164, issued Jan. 25, 1977, B. Proctor describes a method for the manufacture of plastic containers with integral rims in which plastic material is compressed into an annular groove in a transfer ring. The material in the annular groove forms the integral rim of the container on moulding. In the process described by Proctor an annulus of plastic material is not formed.

The method and apparatus described by Proctor have had significant commercial success with a number of thermoplastic materials, for example, polystyrene. However, containers manufactured from polyethylene or polypropylene have been found to be capable of substantial improvement, especially with regard to the characteristics of those containers, e.g., aesthetics and uniformity of the thickness of the walls of the containers.

A method for the manufacture of plastic containers from polyethylene or polypropylene so as to obtain containers of improved quality has now been found.

SUMMARY OF THE INVENTION

Accordingly, the present invention provides an improvement in a method for the manufacture of plastic containers comprising:

A. forming a pre-form of thermoplastic material in a transfer means,

B. applying the transfer means carrying the preform to a mould having a cavity corresponding to the shape of the container, C. forming the pre-form into a container in the mould cavity, and D. separating the container from the cavity, the improvement comprising (a) forming the pre-form by introducing into a closed space between opposite sides of the transfer means a predetermined amount of a thermoplastic material selected from the group consisting of polyethylene and polypropylene, the material being introduced through a passage of at least 0.50 cm diameter in one side of the transfer means, and the closed space being defined by surfaces having a surface roughness in the range of 50–125 $\mu$m rms, and (b) mechanically compressing the thermoplastic material within the closed space by applying pressure from the other side of the transfer means prior to completion of the introduction of the material into the closed space, and completing the compression after the passage is closed.

As used herein, the expression "rms" means root means square and is used with reference to the measurement of the roughness of the surface of the closed space described herein on the basis of the average deviation from the mean position of the surface.

The present invention relates to a method for the manufacture of plastic containers that is generally referred to in the trade as thermoforming. The thermoforming process to which the present invention relates consists of three basic processes performed on a horizontal indexing table. The three processes are normally performed simultaneously on different pre-forms of thermoplastic material. A particular example of such a thermoforming process is described in detail in the aforementioned patent of B. Proctor.

In general terms, a reciprocating extruder meters a predetermined amount of molten thermoplastic material into a closed space in a compression mould. The molten thermoplastic material is then compressed to form a pre-form. The pre-form is applied to a forming station where a plug-assist is normally used to stretch the pre-form, the stretched pre-form then being conformed to the shape of a mould by means of air and vacuum. The container so obtained is then transferred to an ejection station where the container is removed. The cycle is then repeated.

DESCRIPTION OF THE DRAWINGS

The present invention will be described with reference to the apparatus used in preparing the preform, as shown in the drawings in which:

Referring to FIG. 1, a compression mould, generally indicated by 1, is comprised of upper transfer ring 2, lower transfer ring 3, transfer plate 4, compression ring 5, compression piston 6, injection plate 7 and conduit 8. Transfer plate 4 is formed with a recess having an internal lip 9 which can support upper transfer ring 2 and lower transfer ring 3. Retaining groove 10 is formed between upper transfer ring 2 and lower transfer ring 3, groove 10 forming the edge of closed space 11. Closed space 11 is primarily formed by the lower surface of injection plate 7 and the upper surface of compression piston 6.

Figure 1:
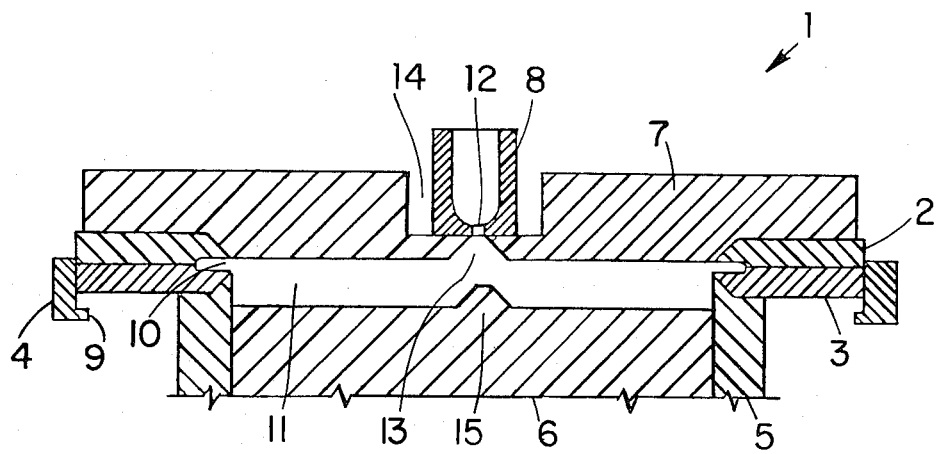
FIG. 1 is a schematic representation of apparatus defining a closed space prior to introduction of molten thermoplastic polymer.

Conduit 8 is equipped with a passage 12 which, in FIG. 1, is in fluid-flow communication with inlet 13. Conduit 8 is positioned in recess 14 which is centrally located in injection plate 7. Inlet 13 is located in recess 14 and communicates with closed space 11. Inlet 13 is of a similar but slightly larger diameter to passage 12, but increases in diameter as it merges with closed space 11.

The upper surface of compression piston 6 conforms to the lower surface of injection plate 7, the upper surface of compression pistons 6 having a projection 15 corresponding to inlet 13.

Figure 2:
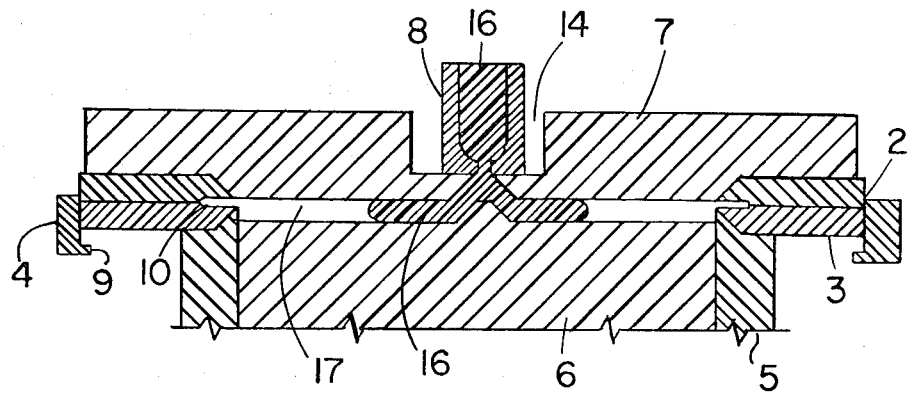
FIG. 2 is a schematic representation of apparatus defining a closed space showing introduction of molten thermoplastic polymer.

In FIG. 2, thermoplastic material 16 is shown in conduit 8, passage 12, inlet 13 and part of the closed space. The closed space, designated 17 in FIG. 2, is of smaller volume, even including that part of thermoplastic material 16 that is within the closed space, than closed space 11 of FIG. 1 as a result of compression piston 6 being closer to injection plate 7 in FIG. 2 than in FIG. 1.

Figure 3:
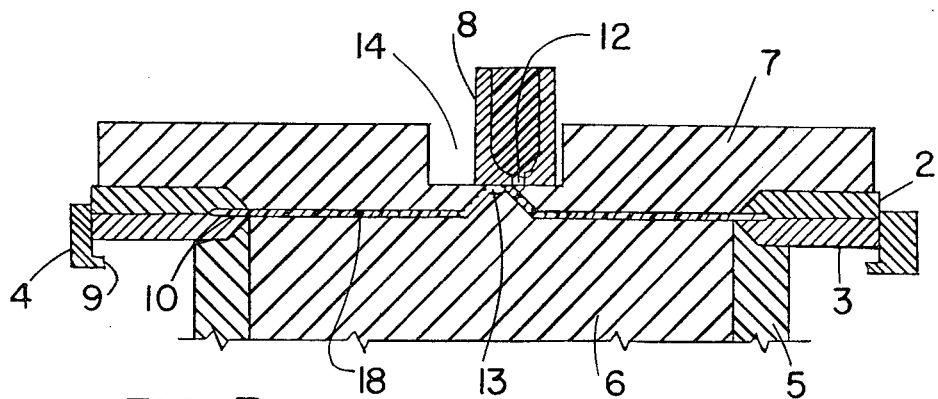
FIG. 3 is a schematic representation of apparatus defining a closed space showing the pre-form of thermoplastic material.

In FIG. 3, conduit 8 is located in recess 14 so that passage 12 is not in fluid-flow communication with inlet 13. Compression piston 6 and injection plate 7 are spaced apart so that the thermoplastic material forms pre-form 18. In the embodiment shown, the thickness of pre-form 18 is the same as the thickness of retaining groove 10.

Although not shown herein, the apparatus shown in FIGS. 1-3, is used in conjunction with means for forming a container from pre-form 18 and means to eject the container so formed from the apparatus. Such means are shown and discussed in the aforementioned patent of B. Proctor, the disclosure of which is incorporated herein by reference.

DETAILED DESCRIPTION OF THE INVENTION

In operation, compression piston 6 is initially in the spaced-apart relationship with injection plate 7 that is shown in FIG. 1. Conduit 8 is located so that passage 12 is in fluid-flow relationship with inlet 13. A predetermined amount of molten thermoplastic material 16 is injected from conduit 8 through passage 12 and inlet 13 into closed space 11. At the same time as the thermoplastic material 16 is injected through passage 12, compression piston 6 is moved towards injection plate 7. The injection of thermoplastic material 16 and the movement of compression piston 16 is coordinated so that at all times during the formation of pre-form 18 shown in FIG. 3, the thermoplastic 16 is in a state of flow. In particular, the front of thermoplastic material continuously advances through closed space 17. When the required amount of thermoplastic material 16 has been injected into closed space 17, conduit 8 is moved out of fluid-flow communication with inlet 13. Compression piston 6 continues to advance towards injection plate 7 until closed space 17, including retaining groove 10, is completely filled, thereby forming pre-form 18. Compression piston 6 moves until it is at a predetermined distance from injection plate 7.

Subsequently, using apparatus not shown, pre-form 18 is applied to a moulding station using upper transfer ring 2 and lower transfer ring 3 so that a moulded container may be formed. The moulded container is then transferred, using upper transfer ring 2 and lower transfer ring 3, to an ejection station where the container is ejected.

The thermoplastic material of the present invention may be polypropylene or polyethylene. The polyethylene may be a homopolymer of ethylene or a copolymer of ethylene and a higher α-olefin, especially a higher α-olefin having 4-8 carbon atoms, e.g., butene-1, hexene-1 or octene-1. Such polymers must have the physical characteristics necessary to permit the thermoforming process to be carried out. Preferably, the polyethylene is a homopolymer or copolymer of ethylene having a density, as measured by the procedure of ASTM D-1505, in the range 0.940-0.970 g/cm$^3$ and a melt index, as measured by the procedure of ASTM D-1238 (condition E), in the range 0.4-1.0 and especially in the range 0.4-0.8.

It is important that passage 12 have a diameter of at least 0.5 cm in order to facilitate a uniform flow of thermoplastic material through passage 12 and inlet 13 into the closed space. Moreover, inlet 13 should be reamed out, as shown in the drawings, so as to not restrict the flow of material into the closed space. If the flow is not uniform, melt fracture of the polymer may occur, thereby resulting in the manufacture of containers that tend to exhibit so-called stress lines, as well as variations in the thickness of the walls thereof and which are capable of significant improvement aesthetically. Melt fracture is a phenomenon known in the art relating to non-uniform flow through an orifice as a result of high shear stresses in the polymer. The resultant polymer extrudate has a rough exterior surface which manifests itself as visible stress patterns in the containers manufactured therefrom.

The entire surface of the closed space that comes into contact with polymer must be a uniformly roughened surface. In particular, the surface must have a surface roughness in the range 50-125 μm rms, especially 80-100 μm rms. A surface roughness in the range 85-95 μm rms is preferred. Such a surface may be obtained by wet sandblasting a surface of the closed space having a surface roughness of less than 50 μm rms.

An important feature of the method of the present invention is that the thermoplastic material is injected into closed space 17 at the same time as the compression piston 6 compresses closed space 17. Such simultaneous injection and compression is carried out in a manner that ensures that the front edge of polymer, i.e., the polymer/air interface, is continuously advancing. As is exemplified hereinafter, if the front is permitted to become stationary at any time, the resultant container is capable of improvement, especially aesthetically. A line of differing optical properties, a so-called haze line, and variations in thickness tend to occur.

The method of the present invention may be used in the manufacture of thin-walled plastic containers, for example, containers for margarine, tubs, cups, flower pots, and the like, from polypropylene or polyethylene.

The present invention is illustrated by the following examples:

EXAMPLE I

Apparatus for the thermoforming of containers and of the type generally described hereinbefore as being of the prior art, especially that of the patent of B. Proctor, was obtained. The apparatus was a MONAFORMER ® 140/30 obtained from the Hayssen Manufacturing Company of Sheboygan, Wis., U.S.A., and was adapted for the manufacture of containers of the type used for the packaging of margarine.

The apparatus was tested using polystyrene (DOW ® type t8526) and was shown to produce 0.25 liter and 0.5 liter containers of good quality. The apparatus appeared to be relatively insensitive to changes in operating conditions, containers of good quality being thermoformable from polystyrene over a wide range of operating conditions. However, subsequent attempts to produce 0.5 liter containers of good quality from polypropylene and polyethylene were unsuccessful.

In order to thermoform polypropylene and polyethylene, the following modifications were made:

Modification A—the diameter of the passage was increased from 0.295 cm to 0.625 cm and the inlet was reamed out so that the angle of the surface of the inlet to the axis of the passage was increased from 41° to 55°.

Modification B—the surfaces that form the closed space were wet sandblasted to a surface roughness of 85-95 μm rms, the roughness prior to wet sandblasting being ca. 10-15 μm rms.

Modification C—the sequence of steps for forming the pre-form was altered so that the mechanical compression of the thermoplastic material commenced prior to the completion of the introduction of material into the closed space instead of after completion of the introduction of material. As a result, the thermoplastic material was in a state of flow at all times between the commencement of introduction of material into the closed space and the completion of the forming of the pre-form.

The apparatus and process modified according to A, B or C above was tested in the manufacture of 0.5 liter containers using a number of polyethylenes as the thermoplastic material. Further details of the tests and the results obtained are given in Table I.

TABLE I

| Run | Polymer* | Modifications** A | B | C | Polymer Melt Temperature (°C.) | Comments |
|---|---|---|---|---|---|---|
| 1 | 1 | yes | yes | yes | 272 | Good quality container, uniform high gloss finish. |
| 2 | 1 | no | yes | no | 272 | Container showed a haze line. |
| 3 | 2 | yes | yes | yes | 272 | Good quality container, uniform matte finish. |
| 4 | 2 | yes | no | no | 272 | Container showed stress marks and was not of uniform thickness. |
| 5 | 3 | yes | yes | no | 204 | Melt fracture at inlet, container had haze line. |
| 6 | 4 | yes | yes | yes | 272 | Good quality container. |
| 7 | 4 | yes | no | no | 272 | Container showed a haze line. |

**runs in which all three modifications had been carried out are of this invention. Other runs are included for comparison.
*Polymer 1—ethylene/butene-1 copolymer of a density of 0.956, a melt index of 1.0 and a stress exponent of 1.30.
Polymer 2—ethylene homopolymer of a density of 0.960, a melt index of 0.4 and a stress exponent of 1.8 (SCLAIR ® 19A).
Polymer 3—ethylene homopolymer of a density of 0.960, a melt index of 7.3 and a stress exponent of 1.26 (SCLAIR ® 2908UV).
Polymer 4—Polymer 1 plus 1% TiO₂.

EXAMPLE II

The procedure of Example I was repeated using polypropylene as the thermoplastic material. Details of the tests and the results obtained are given in Table II.

TABLE II

| Run | Polymer* | Modifications** A | B | C | Polymer Melt Temperature (°C.) | Comments |
|---|---|---|---|---|---|---|
| 8 | 5 | no | no | no | 272 | Fair container, showed streaks and stresses. |
| 9 | 6 | yes | no | no | 204 | Good container, some evidence of stresses. |
| 10 | 7 | yes | no | no | 210 | Good container but haze line. |
| 11 | 7 | yes | yes | yes | 272 | Good quality container. |

**runs in which all three modifications had been carried out are of this invention. Other runs are included for comparison.
*Polymer 5—AMOCO ® polypropylene 506104.
Polymer 6—AMOCO ® polypropylene 8104.
Polymer 7—PROFAX ® 7523 polypropylene.

We claim:
1. Improvement in the process for manufacture of plastic containers comprising
   A. forming a pre-form of thermoplastic material in a transfer means,
   B. applying the transfer means carrying the pre-form to a mould having a cavity corresponding to the shape of the container,
   C. forming the pre-form into a container in the mould cavity, and
   D. separating the container from the cavity, the improvement comprising (a) forming the pre-form by introducing into the closed space between opposite sides of the transfer means a predetermined amount of a thermoplastic material selected from the group consisting of polyethylene and polypropylene, the material being introduced through a passage of at least 0.50 cm diameter in one side of the transfer means, and the closed space being defined by surfaces having a surface roughness in the range of 50-125 μm rms, and (b) mechanically compressing the thermoplastic material within the closed space by applying pressure from the other side of the transfer means prior to completion of the introduction of the material into the closed space, and continuing the mechanical compression after the passage is closed until the closed space is completely filled, the thermoplastic material being maintained in a state of flow in the closed space at all times between the commencement of introduction of the material into the closed space and the completion of the mechanical compression of the material.
2. The method of claim 1 in which the thermoplastic material is polypropylene.
3. The method of claim 1 in which the thermoplastic material is polyethylene.
4. The method of claim 3 in which the thermoplastic material is polyethylene of a density in the range 0.940-0.970 g/cm³ and a melt index in the range 0.4-1.0.
5. The method of claim 4 in which the polyethylene is a homopolymer of ethylene.
6. The method of claim 4 in which the polyethylene is a copolymer of ethylene and a higher α-olefin having 4-8 carbon atoms.
7. The method of claim 1, claim 2 or claim 4 in which the surface roughness is 85-95 μm rms.

* * * * *